(12) United States Patent  
Olson

(10) Patent No.: US 8,044,558 B2  
(45) Date of Patent: Oct. 25, 2011

(54) DIMMABLE HIGH PRESSURE ARC LAMP APPARATUS AND METHODS

(75) Inventor: Scot Olson, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1096 days.

(21) Appl. No.: 11/638,183

(22) Filed: Dec. 13, 2006

(65) Prior Publication Data

US 2008/0143262 A1  Jun. 19, 2008

(51) Int. Cl.
 *H01J 7/24* (2006.01)
 *H01J 7/44* (2006.01)
(52) U.S. Cl. .......................................... 313/15; 315/115
(58) Field of Classification Search ................ 313/15, 313/595; 315/47, 115
See application file for complete search history.

(56) References Cited

U.S. PATENT DOCUMENTS

| 3,757,159 A * | 9/1973 | Gutta et al. ............... 315/47 |
| 4,161,672 A | 7/1979 | Cap et al. |
| 4,179,640 A * | 12/1979 | Larson et al. .............. 315/47 |
| 4,398,130 A | 8/1983 | McFadyen et al. |
| 4,658,184 A * | 4/1987 | Gaspar ........................ 315/47 |
| 4,734,612 A * | 3/1988 | Sasaki et al. ............... 313/15 |
| 4,884,009 A * | 11/1989 | Rothwell et al. ........... 315/246 |
| 5,150,017 A | 9/1992 | Geens et al. |
| 5,319,282 A | 6/1994 | Winsor |
| 5,612,593 A | 3/1997 | Olson |
| 5,939,830 A | 8/1999 | Praiswater |
| 6,118,415 A | 9/2000 | Olson |
| 6,775,460 B2 | 8/2004 | Steiner et al. |
| 2003/0198456 A1* | 10/2003 | Steiner et al. ............ 385/146 |
| 2006/0181222 A1* | 8/2006 | Deurloo et al. .......... 315/209 R |

FOREIGN PATENT DOCUMENTS

GB   2316246 A  * 2/1998

* cited by examiner

*Primary Examiner* — Karabi Guharay
(74) *Attorney, Agent, or Firm* — Ingrassia Fisher & Lorenz, P.C.

(57) ABSTRACT

A dimmable arc lamp assembly comprises a lamp enclosure comprising a chamber enclosing a light-emitting material, first and second electrodes extending into the chamber of the lamp enclosure, and a heating element proximate the chamber configured to heat at least a portion of the lamp enclosure to a temperature greater than the boiling point of the light-emitting material such that the light-emitting material remains in a gaseous state. Because the light-emitting material remains above its boiling point during lamp operation, dimming is not susceptible to control issues that can result from condensation of the light-producing material. Such lamps may be used in various applications such as in flat panel displays.

15 Claims, 2 Drawing Sheets

DIMMABLE HIGH PRESSURE ARC LAMP APPARATUS AND METHODS

TECHNICAL FIELD

The present disclosure generally relates to high-pressure arc lamps, and more particularly relates to techniques and structures for managing the dimming of high pressure arc lamp assemblies such as those used in liquid crystal displays.

BACKGROUND

An arc lamp is any light source in which an electric arc produces visible light. Typically, arc lamps include a glass or plastic tube that is filled with light-emitting materials such as argon, mercury, sodium or other inert gas. When an electric potential is applied between two electrodes inserted into the tube, the resultant electric arc breaks down the gaseous materials and produces an ongoing plasma discharge that results in visible light.

Arc lamps have provided lighting in numerous home, business and industrial settings for many years. More recently, arc lamps have been used as backlights in liquid crystal displays such as those used in computer displays, cockpit avionics, flat panel televisions and the like. Such displays typically include any number of pixels arrayed in front of a relatively flat light source. By controlling the light passing from the backlight through each pixel, color or monochrome images can be produced in a manner that is relatively efficient in terms of physical space and electrical power consumption.

Despite the widespread adoption of displays and other products that incorporate arc light sources, however, designers continually aspire to improve the performance of the light source, as well as the overall performance of the display. In particular, the nature of many arc lamps can lead to difficulties in controlling a dimmable display. As a result, various techniques for controllable dimming the light produced from an arc lamp have been attempted, with varying degrees of success.

Accordingly, it is desirable to provide devices and techniques for effectively and efficiently controlling the brightness of various arc lamps and arc lamp displays. Other desirable features and characteristics will become apparent from the subsequent detailed description of the invention and the appended claims, taken in conjunction with the accompanying drawings and this background of the invention.

BRIEF SUMMARY

Numerous lamp assemblies, displays and techniques are described herein. Various embodiments, for example, provide a dimmable arc lamp assembly that comprises a lamp enclosure comprising a chamber enclosing a light-emitting material, first and second electrodes extending into the chamber of the lamp enclosure, and a heating element proximate the chamber configured to heat at least a portion of the lamp enclosure to a temperature greater than the boiling point of the light-emitting material such that the light-emitting material remains in a gaseous state. Because the light-emitting material remains above its boiling point during lamp operation, dimming is not susceptible to control issues that can result from condensation of the light-producing material. Such lamps may be used in various applications, such as in flat panel displays.

In other exemplary embodiments, a method of operating an arc lamp suitably comprises a lamp enclosure housing a light-producing material in contact with first and second electrodes. Various embodiments of the exemplary method comprise the steps of: heating the lamp enclosure to a lamp temperature equal to at least a boiling temperature of the light-producing material; providing an electric potential across the first and second electrodes to thereby produce an amount of light from the light-producing material; and adjusting the electric potential across the first and second electrodes to adjust the amount of light produced by the light-producing material.

Other embodiments include other lamps or displays incorporating structures and/or techniques described herein. Additional detail about various example embodiments is set forth below.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely example in nature and is not intended to limit the invention or the application and uses of the invention. Furthermore, there is no intention to be bound by any theory presented in the preceding background of the invention or the following detailed description of the invention.

According to various exemplary embodiments, an arc lamp is provided with a heat source (such as a resistive or radiant heat source) that maintains the light-producing material at or above its boiling point so that the material remains in the gaseous state during lamp operation. Because the material in the lamp bulb remains in the gaseous state, it generally behaves with substantial linearity during the dimming process, thereby improving the ease with which the lamp can be dimmed. Any source of heat can be used, such as a simple resistive wire wrapped around the bulb, or a radiant heat source that simply warms the environment surrounding the bulb. Any other source of heat may be used in any number of equivalent embodiments.

Figure 1:
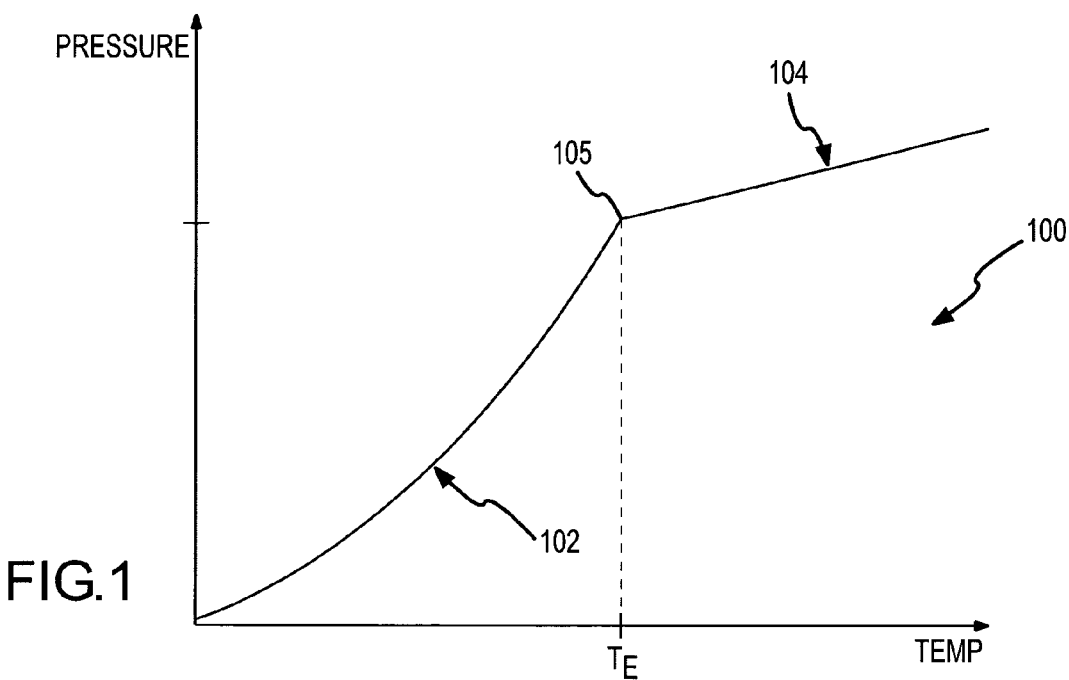
FIG. 1 is an exemplary pressure versus temperature plot for an exemplary arc lamp.

With initial reference to FIG. 1, a general principal of operation can be described with respect to plot 100, which shows the typical pressure versus temperature behavior of the light-producing materials found within the arc lamp bulb. Generally speaking, the light-producing materials behave as an ideal gas when the temperature is in excess of the material's boiling point. This portion of plot 100 is shown as section 104 to the right of transition point 105. To the left of transition point 105, the temperature is below the boiling point of the light-producing material, meaning that condensation can take place and droplets of liquid can form within the bulb. When condensation occurs, the pressure generally decreases exponentially with temperature, and this is shown as region 102 of plot 100. Point 105 on plot 100, then, corresponds to the point at which the light-producing material found within the internal chamber of the bulb remains in the gaseous state. Operation to the right of transition point 105 (corresponding to temperature greater than $T_E$) generally exhibits a linear pressure curve, whereas operation to the left of transition point 105 (corresponding to a temperature less than $T_E$) generally exhibits an exponential pressure curve.

The linearity of region 104 in plot 100 can be derived from the well-known ideal gas law, which is shown in Equation (1) below:

$$P = \frac{nR}{V}T \quad (1)$$

wherein P is pressure (e.g. in Pa), n is the number of moles of ideal gas, R is a constant (e.g. the gas constant of 8.314472 m$^3$·Pa/K·mol), V is the volume (e.g. in cubic meters) and T is the temperature (e.g. in degrees Kelvin). The particular constants and units of measure will vary depending upon the embodiment and the desired system of measurement applied. Nevertheless, since the volume of the arc bulb chamber is typically unchanging, it can be readily stated that the pressure of an ideal gas contained within the arc lamp bulb is linearly related to the temperature. Hence, region 104 of plot 100 is shown as a line with relatively constant slope.

In a typical arc lamp, dimming of the light produced is carried out by reducing the voltage applied to the electrodes of the lamp. As the voltage (and the associated electrical current) in the bulb is reduced, however, the temperature of the bulb typically decreases, thereby producing changes in the bulb pressure that are consistent with plot 100. In most conventional lamps, reducing the brightness (i.e. dimming the lamp) is made significantly more complicated when the temperature of the lamp decreases below transition point 105 and the pressure curve becomes non-linear. Difficulties can arise, for example, from the complexity of driving a plasma with non-linear behavior. To prevent this from occurring, the temperature of the lamp can be maintained above $T_E$ by a separate heat source, thereby providing pressure linearity regardless of the voltage applied to the lamp electrodes.

Figure 2:
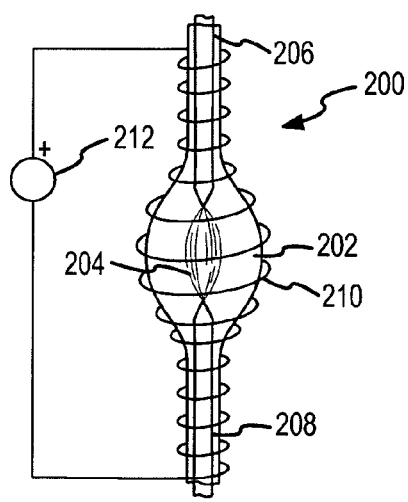
FIG. 2 is a diagram of an exemplary arc lamp with an exemplary heating element.

Referring now to FIG. 2, an exemplary arc lamp 200 suitably includes a bulb or other lamp enclosure 202. Lamp enclosure 202 may be formed, for example, from glass, plastic or other appropriate material. In various embodiments, enclosure 202 contains an internal chamber 204 filled with light-producing material such as argon, neon, xenon, metal halide, sodium, mercury and/or any other material as appropriate. A first electrode 206 and a second electrode 208 suitably extend into chamber 204 of lamp 200 to provide an electric potential 212 that can produce visible light from the light-producing material. Typically, potential 212 is produced from a conventional ballast or power supply circuit as appropriate.

To prevent the lamp 200 from cooling below the transition point (e.g. point 105 in FIG. 1), a supplemental heat source 210 is provided proximate to lamp chamber 204. "Proximate to" in this sense simply means that the heat source 210 is placed in a position that is close enough and oriented such that heat is provided from source 210 to chamber 204. This allows for the temperature in chamber 204 to remain above $T_E$ (FIG. 1) and the light-emitting materials in chamber 204 remain in the gaseous state to provide linear pressure response. When the light emitting materials remain in the gaseous state, the electric potential 212 across electrodes 206 and 208 can be varied to increase or decrease the brightness of lamp 200 without concern that the pressure inside chamber 204 will change in a non-linear manner.

Figure 3:
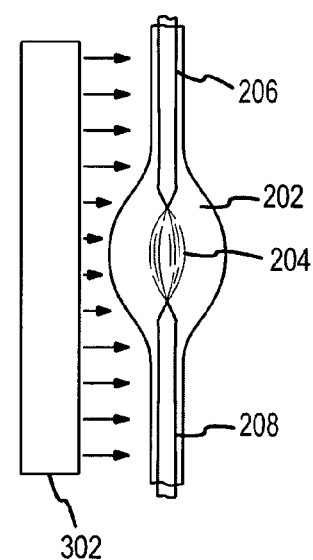
FIG. 3 is a diagram of an exemplary arc lamp with an alternate embodiment of a heating element.

Heat source 210 is any supplemental source of heat energy capable of warming chamber 204 to a temperature greater than $T_E$. In various embodiments, heat source 210 is a simple wire (e.g. a ni-chrome wire) that produces heat from electrical resistance. In other embodiments, heat source 210 can produce heat from any sort of resistive, radiant or other manner. FIG. 3, for example, shows an exemplary enclosure 202 that is warmed by an external radiant heater 302. Again, heat can be provided to enclosure 202 and/or chamber 204 in any manner, using any currently-known or subsequently developed technique for generating heat.

Figure 4:
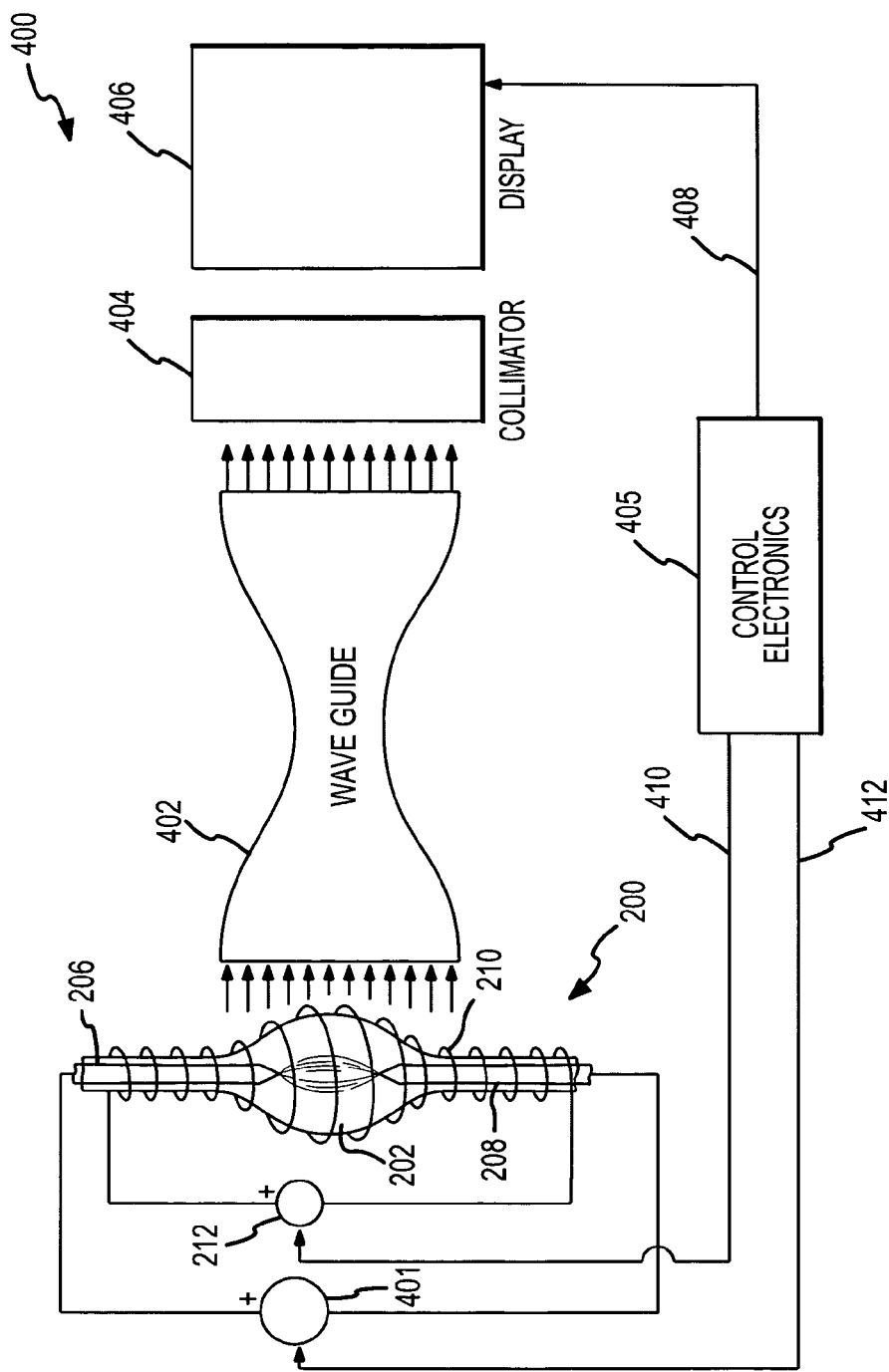
FIG. 4 is a block diagram of an exemplary display assembly having a heated arc lamp assembly.

Turning now to FIG. 4, an exemplary display assembly 400 suitably includes an arc lamp 200 that provides light to a waveguide 402. Typically, light emitted from the opposite end of waveguide 402 is collimated (e.g. by collimator 404) or otherwise directed toward a liquid crystal or other display 406 to produce a viewable image. Control electronics 405 suitably provide appropriate control signals 408, 410 and/or 412 to direct the production and transmission of light from lamp 200 to display 406. An example of one type of arc lamp display may be found in U.S. Pat. No. 6,775,460 (which is assigned the same assignee as the present disclosure), although the concepts set forth herein may be used with any type of arc lamp display or other arc lamp application.

Control electronics 406 include any integrated, discrete and/or other electronic components that are useful for controlling the operation of any part of display assembly 400. In various embodiments, control electronics 406 include a digital microcontroller capable of executing instructions in digital object code form to execute the logical processes of controlling the display assembly. Such instructions may be encoded and stored in any manner, such as in any type of read-only, random access and/or flash memory, and/or may be embedded as firmware, microcode or the like. In other embodiments, control electronics 406 are implemented with programmable arrays and/or discrete logic capable of providing similar functionality.

The particular operation of the display assembly 400 varies from embodiment to embodiment. In one example, control electronics 405 activate a power supply 212 associated with heat source 210 via a control signal 410. Signal 410 may be used to activate the source prior to or during lamp operation, and may be modified as appropriate. In various embodiments, heat source 210 is only activated while the temperature of the lamp 202 (or chamber 204 of lamp 202) drops below the transition temperature or boiling point of the light-emitting materials residing in chamber 204. In other embodiments, heat source 210 remains active through operation of the display. In such cases, the operation of heat source 210 may be modulated or otherwise adjusted as appropriate to maintain the desired temperature of lamp 202 and/or chamber 204. In still other embodiments, heat source 210 may be activated only when the brightness of lamp 202 is dimmed to a level that would otherwise result in operation to the left of point 105 in plot 100. In such embodiments, control (e.g. via signal 412) of ballast or other power supply 401 provides primary dimming control by varying the electrical potential applied across the electrodes (e.g. electrodes 206, 208) of lamp 202, while control via signal 410 activates heat source 210 to ensure that lamp temperature does not drop below the transition point $T_E$ (FIG. 1). Control signal 408, in turn (which typically represents many separate or multiplexed control signals) is provided to control the liquid crystal or other pixel elements of display 406 to pass, filter, block and/or otherwise affect light transmitted to display 406 from lamp assembly 200. Many other equivalent operating techniques could be formulated without departing from the concepts set forth herein.

While at least one example embodiment has been presented in the foregoing detailed description of the invention, it should be appreciated that a vast number of variations exist. It should also be appreciated that the example embodiment or example embodiments are only examples, and are not intended to limit the scope, applicability, or configuration of the invention in any way. Rather, the foregoing detailed description will provide those skilled in the art with a convenient road map for implementing an example embodiment of the invention. It should be understood that various changes may be made in the function and arrangement of elements described in an example embodiment without departing from the scope of the invention as set forth in the appended claims and their legal equivalents.

What is claimed is:

1. An arc lamp assembly comprising:
  a lamp enclosure comprising a chamber enclosing a light-emitting material;
  first and second electrodes extending into the chamber of the lamp enclosure;
  a heating element proximate the chamber configured to heat at least a portion of the lamp enclosure to a temperature greater than the boiling point of the light-emitting material;
  a power supply coupled to the first and second electrodes and configured to adjust an electric potential across the electrodes to thereby increase and decrease the brightness of the arc lamp during operation of the arc lamp assembly; and
  control electronics coupled to the heating element and to the power supply, and wherein the control electronics is configured to activate the heating element when while when the electric potential across the electrodes is reduced during operation of the arc lamp assembly to thereby maintain the temperature of the light-emitting material above its boiling point.

2. The arc lamp assembly of claim 1 wherein the heating element comprises a wire wrapped around the lamp enclosure.

3. The arc lamp assembly of claim 1 wherein the heating element comprises a radiant heat source.

4. The arc lamp assembly of claim 1 wherein the heating assembly comprises a resistive heat source.

5. The arc lamp assembly of claim 1 wherein the light-emitting material comprises at least one of the group consisting of: mercury, metal halide and sodium.

6. A flat panel display comprising the arc lamp assembly of claim 1.

7. A display assembly comprising:
  a light source comprising an arc lamp, wherein the arc lamp comprises a lamp enclosure comprising a chamber enclosing a light-producing material and having first and second electrodes extending therein, wherein the light source is configured to produce a light in response to an electrical potential being applied across the first and second electrodes;
  a heating element proximate the light source and configured to heat at least a portion of the lamp enclosure to a temperature greater than a boiling point of the light-emitting material;
  a waveguide configured to receive and transmit the light produced by the light source;
  a display configured to receive the light transmitted by the waveguide; and
  control electronics configured to control the electrical potential applied across the first and second electrodes and wherein the control electronics are further configured to activate the heating element when the electrical potential applied across the first and second electrodes is reduced during operation of the arc lamp to thereby maintain the light-emitting material in a gaseous state throughout operation of the arc lamp.

8. The display assembly of claim 7 wherein the control electronics are further configured to control the display to produce a viewable image.

9. A method of operating an arc lamp comprising a lamp enclosure housing a light-producing material in contact with first and second electrodes, the method comprising the steps of:
  heating the lamp enclosure to a lamp temperature equal to at least a boiling temperature of the light-producing material throughout operation of the arc lamp;
  providing an electric potential across the first and second electrodes to thereby produce an amount of light from the light-producing material; and
  adjusting the electric potential across the first and second electrodes to adjust the amount of light produced by the light-producing material;
  wherein the heating step comprises applying heat to the lamp enclosure when the electric potential across the first and second electrodes is reduced during operation of the arc lamp assembly to thereby maintain the lamp temperature equal to at least the boiling temperature of the light-producing material even during dimming of the arc lamp.

10. The method of claim 9 wherein the heating step comprises activating a heating element in proximity to the lamp enclosure.

11. The method of claim 10 wherein the heating element is activated when the electric potential across the first and second electrodes is adjusted in the adjusting step to be insufficient to maintain the light-producing material in its gaseous state.

12. The method of claim 10 wherein the adjusting comprises reducing the electric potential during operation of the arc lamp to thereby dim the light produced by the light producing material.

13. The method of claim 12 wherein the heating is activated only during dimming of the arc lamp.

14. The method of claim 10 wherein the heating element comprises a radiant heat source.

15. A computer-readable medium having computer-executable instructions stored thereon that are configured to execute the method of claim 9.

* * * * *

UNITED STATES PATENT AND TRADEMARK OFFICE
CERTIFICATE OF CORRECTION

| | | |
|---|---|---|
| PATENT NO. | : 8,044,558 B2 | Page 1 of 1 |
| APPLICATION NO. | : 11/638183 | |
| DATED | : October 25, 2011 | |
| INVENTOR(S) | : Olson | |

It is certified that error appears in the above-identified patent and that said Letters Patent is hereby corrected as shown below:

Column 5, line 33, "element when while" should be changed to --element--.

Signed and Sealed this
Twentieth Day of March, 2012

David J. Kappos
*Director of the United States Patent and Trademark Office*